(12) United States Patent
Gu

(10) Patent No.: US 10,255,294 B2
(45) Date of Patent: Apr. 9, 2019

(54) SEARCH SYSTEM INTERFACE

(71) Applicant: BRITISH TELECOMMUNICATIONS public limited company, London (GB)

(72) Inventor: Jia Yan Gu, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 343 days.

(21) Appl. No.: 15/024,946

(22) PCT Filed: Sep. 12, 2014

(86) PCT No.: PCT/GB2014/000366
§ 371 (c)(1),
(2) Date: Mar. 25, 2016

(87) PCT Pub. No.: WO2015/044625
PCT Pub. Date: Apr. 2, 2015

(65) Prior Publication Data
US 2016/0232180 A1 Aug. 11, 2016

(30) Foreign Application Priority Data
Sep. 27, 2013 (EP) .................................. 13250103.2

(51) Int. Cl.
*G06F 17/30* (2006.01)
(52) U.S. Cl.
CPC .. *G06F 17/30247* (2013.01); *G06F 17/30268* (2013.01); *G06F 17/30598* (2013.01);
(Continued)
(58) Field of Classification Search
CPC ...................... G06F 17/30247; G06F 17/30268
(Continued)

(56) References Cited

U.S. PATENT DOCUMENTS 5,579,471 A 11/1996 Barber et al.
5,671,411 A 9/1997 Watts et al.
(Continued)

FOREIGN PATENT DOCUMENTS

EP 2 151 994 2/2010
WO 2007/000741 1/2007

OTHER PUBLICATIONS

US 8,369,656 B2, 02/2013, Wang et al. (withdrawn)
(Continued)

*Primary Examiner* — Mark E Hershley
(74) *Attorney, Agent, or Firm* — Nixon & Vanderhye P.C.

(57) ABSTRACT

A search system interface is described. Known search system interfaces are largely unable to find composite articles on the basis of a description of the distribution of content types within them. A problem with providing such a search interface is the laboriousness of generating a suitable query. To address this problem, a display is provided with a key showing content types and associated map symbols. Also provided on the display is a search mapping area, which takes advantage of the fact that parts of text documents, and many other types of searchable items, can be referenced by one or more ordinal values, by having an easily perceivable relationship between position in the search mapping area and position within a target document. By operating the device to offer a digital painting interface such that the user can paint parts of the search mapping area in a visual style associated with the content type the user hopes to find in the corresponding part of the text document, the user is able to rapidly and intuitively provide the search system with a description of how content types would be distributed in documents he wishes to find. The search system interface can similarly be used to specify a desired composition of
(Continued)

articles belonging to different categories over a period of time.

14 Claims, 27 Drawing Sheets

(52) U.S. Cl.
CPC .. *G06F 17/30864* (2013.01); *G06F 17/30914* (2013.01); *G06F 17/30973* (2013.01)

(58) Field of Classification Search
USPC .......................................................... 707/756
See application file for complete search history.

(56) References Cited

U.S. PATENT DOCUMENTS

| | | | |
|---|---|---|---|
| 6,819,797 | B1 | 11/2004 | Smith et al. |
| 7,904,446 | B1 | 3/2011 | Srivastava |
| 2006/0235606 | A1 | 10/2006 | Finn et al. |
| 2007/0016565 | A1* | 1/2007 | Evans .................. G06F 17/3089 |
| 2008/0133592 | A1* | 6/2008 | Peters ............... G06F 17/30256 |
| 2009/0007018 | A1* | 1/2009 | Ikeda .................. G06F 17/3028 715/838 |
| 2009/0076788 | A1* | 3/2009 | Sugahara .............. H04W 24/00 703/13 |
| 2010/0114941 | A1* | 5/2010 | Von Kaenel ...... G06F 17/30241 707/769 |
| 2010/0241507 | A1* | 9/2010 | Quinn .................... G06Q 30/02 705/14.42 |
| 2010/0289882 | A1* | 11/2010 | Ohta .................. H04N 13/0497 348/51 |
| 2011/0072048 | A1 | 3/2011 | Hua et al. |
| 2011/0289106 | A1* | 11/2011 | Rankin, Jr. ............ G06Q 10/10 707/769 |
| 2012/0162244 | A1* | 6/2012 | Ma .................... G06F 17/30277 345/594 |

OTHER PUBLICATIONS

International Search Report for PCT/GB2014/000366, dated Nov. 18, 2014, 2 pages.
Marti A. Hearst, "TextTiling: Segmenting Text into Multi-paragraph Subtopic Passages", Comput. Linguist. 23, 1 (Mar. 1997), pp. 33-64 (32 pages)—available from http://www.aclweb.org/anthology/J97-1003.
Wang, J. and Hua, X-S "Web-scale Image Search by Color Sketch", (Microsoft Research, Asia), MM' 11 Nov. 28-Dec. 1, 2011, Scottsdale, Arizona, USA, ACM 978-1-4503-0616—Apr. 11, 2011 (2 pages).
V. Thai and S. Handschuh, "Reordered Tilebars for Visual Text Exploration", *2009 IEEE Symposium on Visual Analytics Science and Technology*, Atlantic City, NJ, 2009, pp. 225-226 (2 pages).
Screenshot from rightmove.co.uk, (taken in Jul. 2013) (1 page).
Hao Xu, Jingdong Wang, Xian-Sheng Hua, and Shipeng Li. 2010, "Image Search by Concept Map", In Proceedings of the 33rd international ACM SIGIR conference on Research and development in information retrieval (SIGIR '10). ACM, New York, NY, USA, 275-282 (8 pages).
Martin Wattenberg, "Sketching a Graph to Query a Time-Series Database", In CHI '01 (3 pages) Extended Abstracts on Human Factors in Computing Systems (CHI EA '01). ACM, New York, NY, USA, 381-382 (3 pages), 2001 available from http://www.bewitched.com/projects/querysketch/wattenberg-chi2001.pdf.
Y. Watai, T. Yamasaki and K. Aizawa, "View-Based Web Page Retrieval using Interactive Sketch Query," *2007 IEEE International Conference on Image Processing*, San Antonio, TX, 2007, pp. VI-357-VI-360 (4 pages).
Extended European Search Report dated Feb. 19, 2014 issued in EP 13 25 0103 https://register.epo.org/application?number=EP14767064 &Ing=en&tab=doclist, (5 pages).
International Preliminary Report on Patentability and Written Opinion issued in PCT/GB2014/000366 dated Apr. 12, 2016 https://register.epo.org/application?number =EP14767064&Ing=en&tab= doclist, (5 pages).
Office Action and Annex (Communication from the Examining Division and Annex to the Communication) issued in EP 14 767 064, dated Feb. 2, 2018, https://register.epo.org/application?number= EP14767064&Ing=en&tab=doclist (5 pages).
Hao Xu, Jingdong Wang, Xian-Sheng Hua, and Shipeng Li, "Interactive Image Search by 2D Semantic Map", In Proceedings of the 19th international conference on World wide web (WWW '10). ACM, New York, NY, USA, pp. 1321-1324 (4 pages), Apr. 2010.
S. Bhagavathy S., El-Saban M. (2004) SketchIt: "Basketball Video Retrieval Using Ball Motion Similarity", In: Aizawa K., Nakamura Y., Satoh S. (eds) Advances in Multimedia Information Processing—PCM 2004. PCM 2004. Lecture Notes in Computer Science, vol. 3332. Springer, Berlin, Heidelberg (7 pages).
Niblack, Carlton W. et al., "The QBIC Project: Querying Images by Content, using Color, Texture, and Shape", Proceedings of the SPIE, vol. 1908, p. 173-187 (15 pages) (1993)—available from http://www.cse.unsw.edu/au/~cs9314/07sl/lectures/Jian_CS9314_References/The_QBIC_Project.pdf.

\* cited by examiner

| Category ID | Category Label |
|---|---|
| 1 | comedy |
| 1.1 | satire |
| 1.2 | sketch |
| 1.3 | standup |
| 2 | drama |
| 2.1 | soap |
| 2.2 | history |
| 3 | factual |
| 3.1 | business |
| 3.2 | science |
| 3.3 | technology |
| 3.4 | mathematics |
| 3.5 | news |

| Object ID | URL | Title | Category | Date | Start Time | Duration |
|---|---|---|---|---|---|---|
| 0001 | http://www.ted.com/talks/sergey_brin_why_google_glass.html | Why Google Glass | technology | any | any | 00:20:15 |
| 0002 | http://www.youtube.com/watch?v=cw6pHhjhKmk | Multivariable Calculus | mathematics | any | any | 01:02:23 |
| 0003 | http://www.bbc.co.uk/iplayer/episode/b039qx7f/Dragons_Den_Series_11_Episode_3/ | Dragon's Den | business | any | any | 00:58:45 |
| 0004 | https://www.itv.com/itvplayer/coronation-street | Coronation Street | soap | any | any | 00:45:32 |
| 0005 | ... | | | | | |

Figure 5B

| Object ID | Channel (Channel ID) | Title | Annotations | Date | Start Time | Duration |
|---|---|---|---|---|---|---|
| 00101 | BBC (101) | BBC News at Five | news | 01-09-2013 | 00:05:00 | 00:29:50 |
| ... | | | | | | ... |

| Spatial Location (for Selection Page) (Day,Time,Duration) | Rank | Object ID | Location | Name |
|---|---|---|---|---|
| 2013-09-16,15:30,00:30:00 | 1 | 01781 | http://www.bbc.co.uk/iplayer/episode/b00wlg99/Live_at_the_Apollo_Series_6_Episode_3/ | Live at the Apollo – Series 6 Episode 3 |
| 2013-09-16,15:30,00:28:13 | 2 | 01859 | http://www.youtube.com/watch?v=iCsHEpQBRIU | Dave Chappelle – HBO Comedy |
| ... | ... | ... | ... | ... |
| 2013-09-16,15:30,00:30:00 | 9 | 02399 | http://www.youtube.com/watch?v=PfiPbnKl8iO | Michael Mcintyres comedy roadshow s01e06 |
| 2013-09-16,17:15,00:30:00 | 1 | 01578 | http://www.youtube.com/watch?v=7n2-Nar5Jto | Anthony Robbins – Business Mastery |
| ... | ... | ... | ... | ... |
| 2013-09-16,17:15,00:30:00 | 6 | 05678 | http://www.youtube.com/watch?v=-FJv9_Isgmk | Business and Society: Business Ethics |

Figure 6

| Category ID | Category Label |
|---|---|
| 1 | executive summary |
| 2 | introduction |
| 3 | problem statement |
| 4 | about BT |
| 5 | solution statement |
| 6 | benefits |
| 7 | next steps |
| 8 | image |
| 9 | finance |
| 10 | CSR |
| 11 | product type |
| ... | ... |

Figure 20

| 1 | | 3 | 8 | 8 | 8 | |
|---|---|---|---|---|---|---|
| 1 | | 3 | 8 | 8 | 8 | 7 |
| 1 | | 3 | 8 | 8 | 8 | 7 |
| 1 | 1 | 3 | | | | 7 |
| 1 | 1 | 3 | 4 | 4 | | 7 |
| 1 | 1 | 3 | 4 | 4 | | 7 |
| 1 | 1 | 3 | 4 | 4 | | 7 |

Figure 21

| Rank | Item ID | Location | Name | Date |
|---|---|---|---|---|
| 1 | 00012 | https://emea.salesforce.com/00ABEF0146ER | Smith Cargo Inc. ISDN Calls & Lines | 2011-07-30 |
| 2 | 04627 | https://office.bt.com/sites/bidunit/bids/ref01784756 | BT VPLS Solution Putney Foods Bid | 2013-03-23 |
| 3 | 00374 | https://office.bt.com/sites/bidunit/bids/ref00467645 | Mobile Professional Services EMEA | 2012-12-14 |
| 4 | 07485 | https://emea.salesforce.com/00AHJG890FJK | Rural Broadband Proposal 12 Month | 2013-02-07 |

Figure 22

SEARCH SYSTEM INTERFACE

This application is the U.S. national phase of International Application No. PCT/GB2014/000366 filed 12 Sep. 2014, which designated the U.S. and claims priority to EP Patent Application No. 13250103.2 filed 27 Sep. 2013, the entire contents of each of which are hereby incorporated by reference.

BACKGROUND AND SUMMARY

The present invention relates to a search system interface. It has particular utility as a graphical user interface to a system for retrieving digital documents.

Whilst computer-user interfaces moved over two decades ago from menu-driven to graphical user interfaces, in general search interfaces provided by computers remain stubbornly text-based. Whilst graphical user elements like text-fields or drop-down lists might be used, in the vast majority of cases, the user still specifies what he requires by typing words and numbers, or by using a graphical user interface to select from a predetermined list of words or numbers.

An example of a using a graphical user interface to select from a predetermined list of words or numbers is seen in European patent application EP 2 151 994. In that patent application, a user interface for a television is described which allows the user to select icons representing channels, times or genres of content, and to drag and drop the icons in turn onto a search icon. The icons have text on them, the drag-and-drop operation thus being similar to the user selecting words using drop-down menus or check boxes, and then selecting a 'Search' button.

There are some isolated examples of known computerised interfaces which allow a user to specify graphically the output of a system. Most of these relate to searches for images on the World Wide Web. Here, the user is provided with a painting application which he runs and uses to sketch the sort of image he is looking for, data representing that sketch then being sent to an image search engine to find images which have similar colours in similar arrangements.

One example of this is US patent application US 2012/0162244, which discloses an additional feature of converting the user's drawing into textual descriptions of elements of that drawing, and submitting those textual descriptions to a search engine.

Another example is US patent application 2008/0133592 which discloses a computerised application for identifying animals and plants. Here, the user chooses a physical topography which represents the shape of the animal or plant, and then selects and applies colours and/or textures to sections of that framework to best represent whatever animal or plant the user has seen. The computerised application then searches a database to find records which match the user's drawing.

According to a first aspect of the present invention, there is provided a system interface comprising:
  a display device;
  a pointing device;
  a processor in communication with said display device and said pointing device in use, said processor being arranged in operation to:
    i) control said display device to display a system output mapping area;
    ii) receive mapping inputs from said pointing device indicative of:
      a) one or more sub-areas of said system output mapping area; and
      b) one or more system output component categories attributed to each of said sub-areas;
    iii) further control said display device to display, for each display sub-area, a visual indication of the extent of said display sub-area marked with a map symbol symbolising the attribution of the system output component category to that sub-area;
    iv) generate search data from said mapping inputs by converting data defining each of said one or more sub-areas to data defining a corresponding system output region, and associating the system output component category attributed to that sub-area with that system output region; and
    v) pass said search data to said search system.

By providing the user with a search system interface comprising a processor, a pointing device and an associated display device, said devices both being in communication with the processor, and arranging the processor to:
  control the display device to display a system output mapping area;
  receive mapping inputs from said pointing device indicative of one or more sub-areas of said system output mapping area, and one or more system output component categories attributed to each of said sub-areas;
  further control said display device to display, for each sub-area, a visual indication of the extent of said sub-area in association with a map symbol symbolising the system output component category attributed to that sub-area;
  generate search data from said mapping inputs by converting data defining each of said one or more sub-areas to data defining a corresponding system output region, and associating the system output component category attributed to that sub-area with that system output region; and
  pass said search data to said search system, the user is provided with a search system interface which enables him to specify search parameters both through the extent of the sub-area, and by a selection of a map symbol to be applied to that area. Because the map symbol is symbolic, i.e. it represents something other than itself, many different types of search parameter can be specified by the map symbol. Thus, a user interface is provided which can be applied to a greater variety of search types than has hitherto been possible. In particular, the user interface can be applied to searches other than image searches.

Where the user inputs a plurality of sub-areas, the interface allows him, in effect, to draw a map symbolically representing the arrangement of components in different categories which the user wishes to see in search results returned by the search system. In this way, the user is able to specify, rapidly and intuitively, the internal structure of an item, or an arrangement of items, he wishes to obtain from the search system.

It is known to use a pictorial, yet abstract, representation of some variation of a continuously or discretely changing property over some space. Examples include a coloured contour map of a geographical area representing the continuous change in height above sea-level, or a phase diagram in thermodynamics representing the discrete phase change of a substance over a space mapped using pressure and temperature co-ordinates. However, until the advent of the present invention no-one had seen that a similarly abstract, pictorial representation might be used to allow a user to specify a desired composite search result, intuitively and rapidly. Here, abstract in used in the sense that the graphical signs used have symbolic meaning to the user—they symbolize something other than themselves.

The interface can then either be used in searching a database for pre-existing entities composed from categorised constituent parts, or can be used in searching a database for pre-existing categorised items to be composed into a new composite entity.

The pointing device can, for example, be the touchscreen of a tablet, phablet or smartphone, or a gesture detector, or a computer mouse. In the former three cases, the touchscreen also provides the display device. In the latter case, the display is further controlled to display a pointer whose position is controlled by movement of the computer mouse, and tracked by said processor.

The map symbol can take a huge variety of forms. In some embodiments, it is a visual style applied to the sub-area. Visual styles include colours, shades; patterns, gradients, textures, or any combination of two or more of these. Colour is a good choice of visual style since it can be recognised by a user even when applied to a single pixel. In other embodiments, the map symbol might be a label, perhaps outside the area, with an arrow or line linking it to the sub-area.

Preferably, the generation of the search data comprises calculating one or more search parameters as a function of the position of each mapping input on the display. The search data generated might include one ordinal search value type (e.g. time) or two ordinal search value types (e.g. longitude and latitude). The function might generate one ordinal search value type whilst nevertheless depending on both the abscissa and ordinate values of the position of the mapping input on the screen (similar to English text being written using a word processor in a left-to-right, top-to-bottom order—thus the number of words up to a given point in the text depends on both screen co-ordinates).

In cases where the interface is used in searching a database for pre-existing categorised items to be composed into a new composite entity, and the generation of the search data comprises calculating one or more ordinal search values as a function of the position of each mapping input on the display, the processor is preferably further arranged in operation to respond to receipt of said categorised digital items, or identifiers thereof, from the search system by displaying a graphical sign representing one or more digital items at a position in said system output mapping area corresponding to one or more ordinal values characterising said one or more digital items.

When the output mapping area represents a system output space defined by one or more ordinal value types, the system interface is especially well-suited to generating search queries for submission to a spatial database.

In cases where the screen position of a mapping input indicates one ordinal search value type, then two mapping inputs can be taken to define a range of that ordinal search value type to be included in said search data. In cases where the generation of the search data comprises converting the screen position of a mapping input to the values of two ordinal search value types (e.g. converting an input on a geographical map to latitude and longitude values), then the search system interface enables a user to specify a search area rapidly by using the pointing device to generate three or more mapping inputs.

By providing the user with a touchscreen paint interface, the user is able to rapidly input complex shapes more quickly that might be achieved by inputting the points of a polygon defining that area.

In some embodiments, said search system output mapping area features a reference framework indicative of the way in which different parts of the mapping area map to different parts of the output. In embodiments in which said search data comprises two ordinal search value types, said reference framework might comprise reference lines indicating a two-dimensional co-ordinate system to the user. The references lines might, for example, be labelled axes or labelled gridlines to show the co-ordinate system to the user. The co-ordinate system might be a Cartesian co-ordinate system.

In some embodiments, said display is further arranged to display a map symbol key showing map symbols and respective categories to be associated with them.

Preferably, said search system interface is further arranged in operation to control said display to display a palette of said map symbols, wherein said mapping inputs include a user selection of a map symbol from said palette, and further inputs, received whilst said map symbol is selected, defining the region to be occupied by a component of the category associated with said map symbol.

In some embodiments, said system interface further comprises a store storing variable map symbol to category mapping data, and said inputs are further able to alter the 'meaning' of each map symbol, i.e. to alter the category associated with each map symbol. In some of these embodiments, the search data sent by the system interface depends upon the variable map symbol to category mapping data stored in said store.

In some embodiments, the map symbol to category mapping data associates text (e.g. a textual description of a category) with a map symbol. This enables the straightforward generation of a query to a database which stores category information in textual form.

According to a second aspect of the present invention, there is provided a method of operating a system to provide a system interface, said system comprising a display and a pointing device, said method comprising:

controlling said display to display a system output mapping area;

receiving inputs from said pointing device defining, for each of one or more system output component categories, one or more regions within said system output mapping area;

controlling said display to display a system output map by displaying, in each of the specified regions of said system output mapping area, a map symbol symbolising the system output component category attributed to that region by the user; and sending an output specification to said system, said output specification specifying a system output whose composition matches the composition displayed in said system output mapping area.

In some embodiments said method further comprises operating said system to label different sections of digital data items as belonging to different categories. This can usefully enable the retrieval of digital documents having an internal structure which matches an internal structure portrayed by the user using a search system interface according to the first aspect of the present invention. Internal structure here means the position and extent of each document section within the document.

BRIEF DESCRIPTION OF THE DRAWINGS

There now follows, by way of example only, a description of one or more embodiments of the invention. This description is given with reference to the accompanying drawings, in which:

FIG. 4 shows an example of an object taxonomy used to categorise objects stored in a database accessible to the server;

FIG. 5A shows an example of categorised database data representing videos available for on-demand viewing;

FIG. 5B shows an example of categorised database data representing scheduled television transmissions;

FIG. 6 shows a search result which might be returned from the database in response to a visual query generated using the first embodiment;

FIG. 20 shows a data structure used in a second embodiment to store a mapping from content type to annotation ID;

FIG. 21 shows a matrix representing the arrangement of different types of content in a document;

FIG. 22 represents document metadata returned by the database in the second embodiment;

Figure 1:
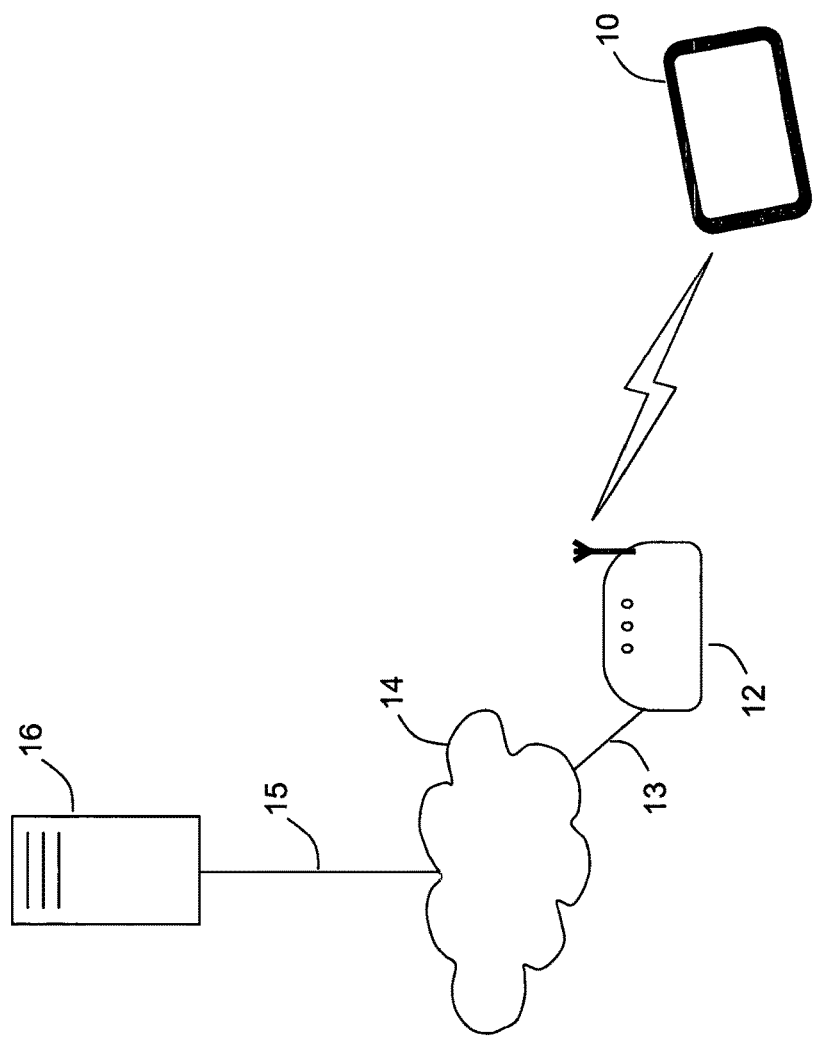
FIG. 1 shows a system architecture for a first embodiment.

A first embodiment provides a user with a facility to schedule their consumption of video content.

DETAILED DESCRIPTION OF PRESENT EXAMPLE EMBODIMENTS

A video watching scheduling system (FIG. 1) has a tablet device 10 (e.g. an Apple iPad) which is in wireless communication with a wireless gateway router 12 (e.g. BT's Home Hub 4). The wireless gateway router 12 in turn has a fixed digital connection 13 to a communications network 14 (for example the Internet). A server computer 16 is connected to the communications network 14 via access line 15. The tablet device 10 and the server computer 16 are respectively provided with client-side and server-side software which provides a user with an intuitive video watching scheduling system as will be described below.

The server computer 16 comprises (FIG. 2) a central processing unit 30, a volatile memory 32, a read-only memory (ROM) 34 containing a boot loader program, and writable persistent memory—in this case in the form of a hard disk 36. The processor 30 is able to communicate with each of these memories via a communications bus 38.

Also communicatively coupled to the central processing unit 30 via the communications bus 38 is a network interface card 40 which provides a communications interface between the server computer 16 and the access line 15 providing a communications link to the communications network 14.

The hard disk 36 of the server computer 16 stores an operating system program 42, a search engine 46, and a database 48 which includes a object-oriented database management system 50, an object taxonomy 51 (which will be described in more detail below), a collection of objects 52 categorised in accordance with the taxonomy 51, each object containing metadata about an audio or video content item, and an index 54 used to enable the rapid retrieval of categorised items from the database in response to a received database query.

The tablet computer (FIG. 3) has a logic board 60, writable persistent memory provided in this case by flash memory 62, a Wi-Fi board 64, a touchscreen controller 66 and touchscreen 68. The flash memory 62 is connected to the logic board by communications bus 70. Other communications links 72, 74 provide communication between the logic board 60 and the Wi-Fi board 64 and touchscreen controller 66. The touchscreen controller 66 is connected to the touchscreen 68 by data display cable 76.

The logic board 60 comprises a central processing unit 78, volatile memory 80, read-only memory (ROM) 82 containing a boot loader program, and a graphics processing unit 84. Communication between these components is enabled by an internal communications bus 86.

The flash memory 62 stores an operating system program 90, and a client-side application 92 which comprises a user interface 94, a query builder module 96 and a selection module 98.

FIG. 4 shows an example of an object taxonomy 51 used to categorise objects stored in the database 48. The object taxonomy stores an association between each of a plurality of category labels and a hierarchical category ID.

The category labels are an example of a set of known labels that represent semantic meaning significant to the items being searched. This can be structured as a taxonomy as illustrated here, but could alternatively be structured as an ontology or flatly structured. The object taxonomy 51 is accessible to both the indexing module provided as part of the database 48 stored at the server computer 16 and also the client-side software application which makes the category labels accessible to the user via the tablet device's 10 user interface as will be described in more detail below.

FIG. 5A shows an example of a data structure used to store the collection 52 of objects in the object-oriented database 48 at the server computer 16. The data structure includes an object containing metadata about each item (each row in the table), the metadata including an object identifier 100, an item identifier value 101, a title value 102, one or more annotations 104, date 106, start time 108, and duration 110. In this example, the item identifier value takes the form of a Uniform Resource Locator which can be provided to the tablet device 10, and which the tablet device 10 can use in order to access the item over the Internet. The annotations 104 in each object indicate the one or more categories to which the item belongs and correspond to the category labels 104 found in the object taxonomy 51 (illustrated in FIG. 4).

Since the videos listed in FIG. 5A are available on-demand, the date and start-time fields are set to an 'any' value for each of the entries.

FIG. 5B shows another part of the database which stores objects related to scheduled video transmissions. Each object has the same properties 100-110 as those found in each object describing an on-demand video. However, since scheduled video transmissions have a predetermined start time, the date 106 and start time 108 properties are set to the start date and start time respectively.

As will be understood by those skilled in the database art, in order to improve the speed with which the database responds to queries, the DBMS will prepare indices which provide a series of references to database entries, those references being ordered in accordance with one or more values found in each database entry. For both the data shown in FIG. 5A and FIG. 5B, the database includes indices on annotations and duration.

Each of the scheduled video transmissions (represented by each row seen in FIG. 5B) has a predetermined position and extent in temporal space. The objects in that part of the database are thus provided with an additional index on start date and time. In other words, the entries in the scheduled video data are spatially indexed—this enabling the rapid retrieval of entries which fall within a defined extent within the space in question.

Only a few example database entries are shown in FIGS. 5A and 5B—in practice such a database might include millions of entries, resulting in the indices (including the spatial index) significantly improving response times to database queries.

In this embodiment database queries generated by the tablet device 10 are sets of spatial queries of the form [function(date, startTime, duration, annotation):boolean]. The function in this case is 'contains' which finds objects which meet the constraints expressed in the remainder of the query.

An example set of spatial queries might therefore be:

```
[contains(2013-09-16,15:30,01:00,comedy):true]
[contains(2013-09-16,17:00,02:00,business):true]
[...]
[user metadata]
```

The user metadata can include user-specific information such as previously watched videos etc. which the search engine 46 can use when returning results. The user metadata might further specify his or her tolerance of error or the fuzzy boundaries in their preferences stored on the client.

FIG. 6 illustrates search results returned to the tablet 10 by the database 48 stored on the server computer 16. The example hits within the result correspond to the example query given above.

Since the query takes the form of a set of spatial queries, the result takes the form of a set of arrays of objects, each array of objects (121-129, 131-136) meeting the constraints found in the corresponding spatial query. Each result object includes a temporal extent 140 (start date, time and duration in this case), a relevance ranking 142 given to each object by the search engine, an object ID 144, a URL 146 and a name 148.

In practice the search results might be returned in eXtensible Markup Language (XML) as will be described below.

Figure 2:
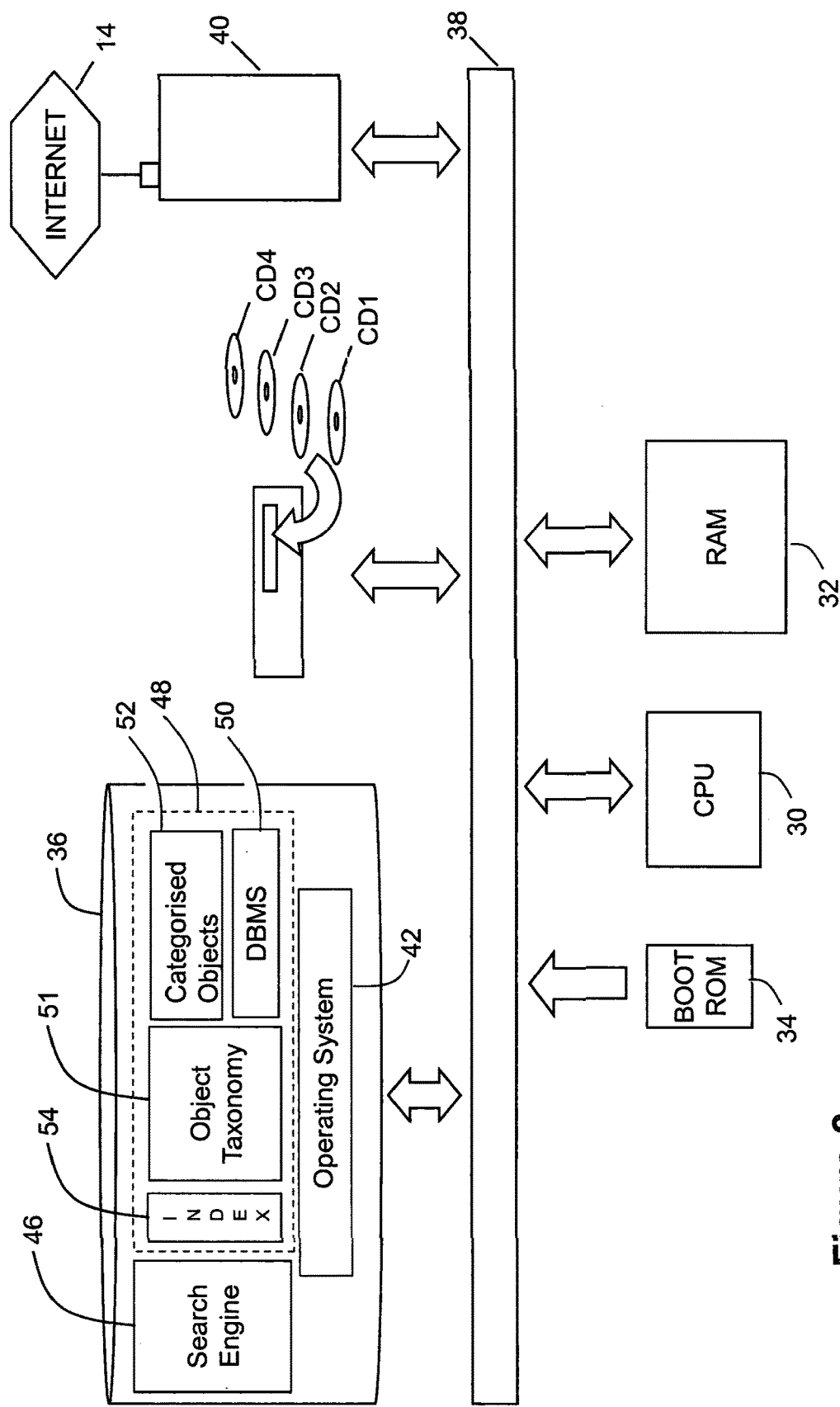
FIG. 2 shows the architecture of the server computer of FIG. 1.
Figure 3:
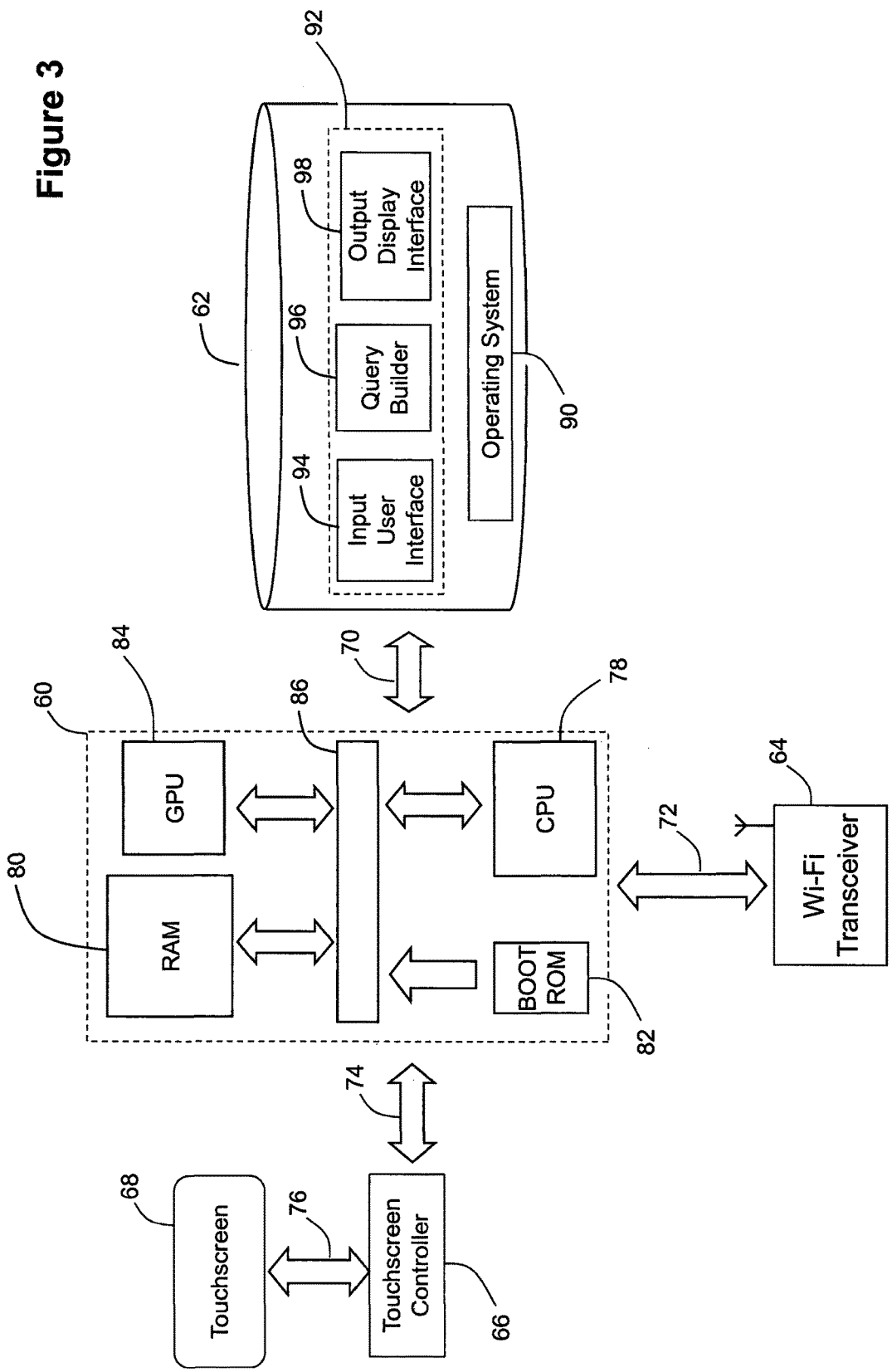
FIG. 3 shows the architecture of the client device of FIG. 1.
Figure 7:
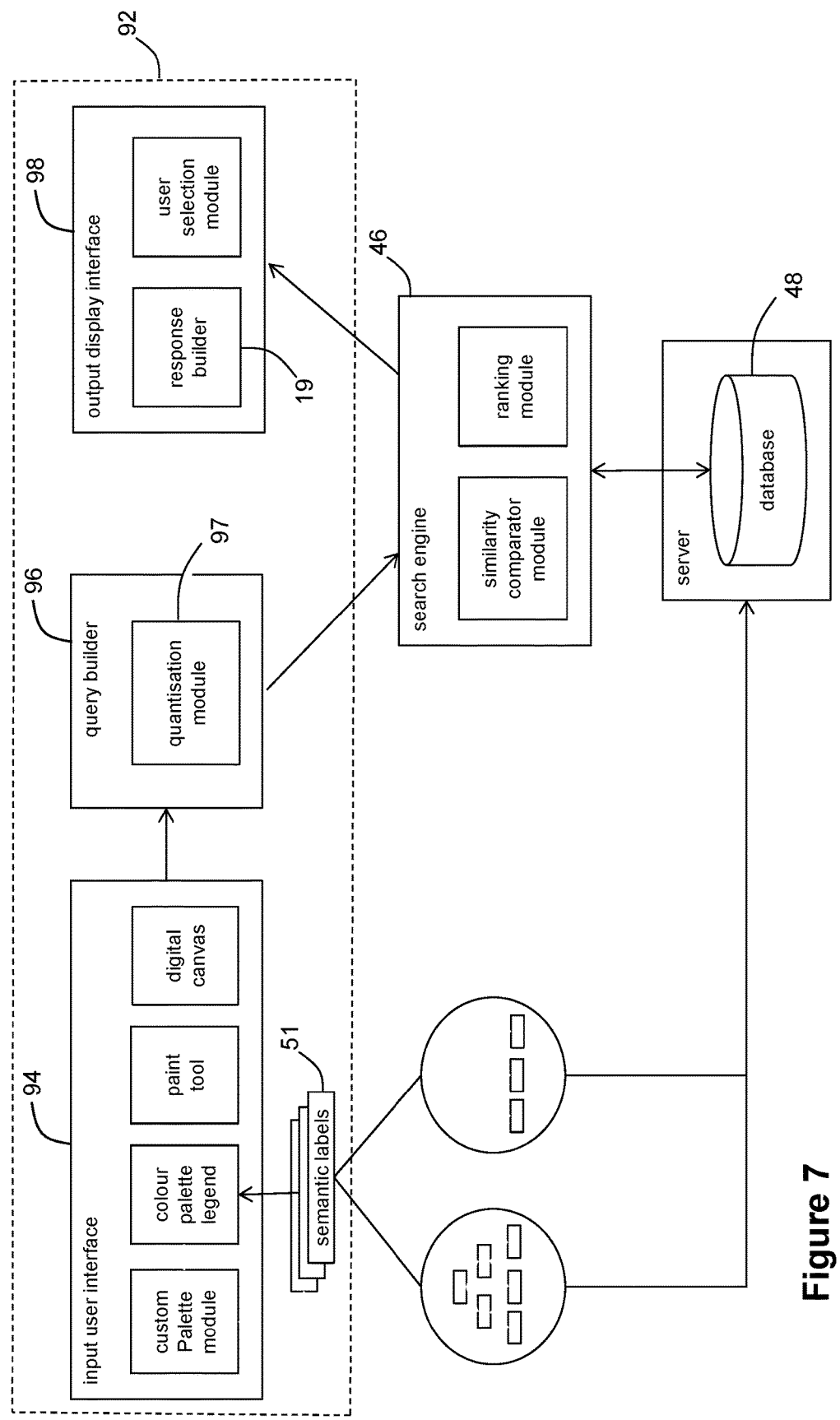
FIG. 7 shows a software architecture used in the first embodiment.

FIG. 7 shows the architecture of the software which runs on the hardware shown in FIGS. 1, 2 and 3. The operation of that hardware under the control of the software will now be described.

On starting, the client application 92 communicates with the database 48 to synchronize the semantic label system by sending a query to fetch the object taxonomy 51 stored in the database 48. The client application 92 stores the object taxonomy 51 in the tablet's volatile memory 80.

Figure 8:
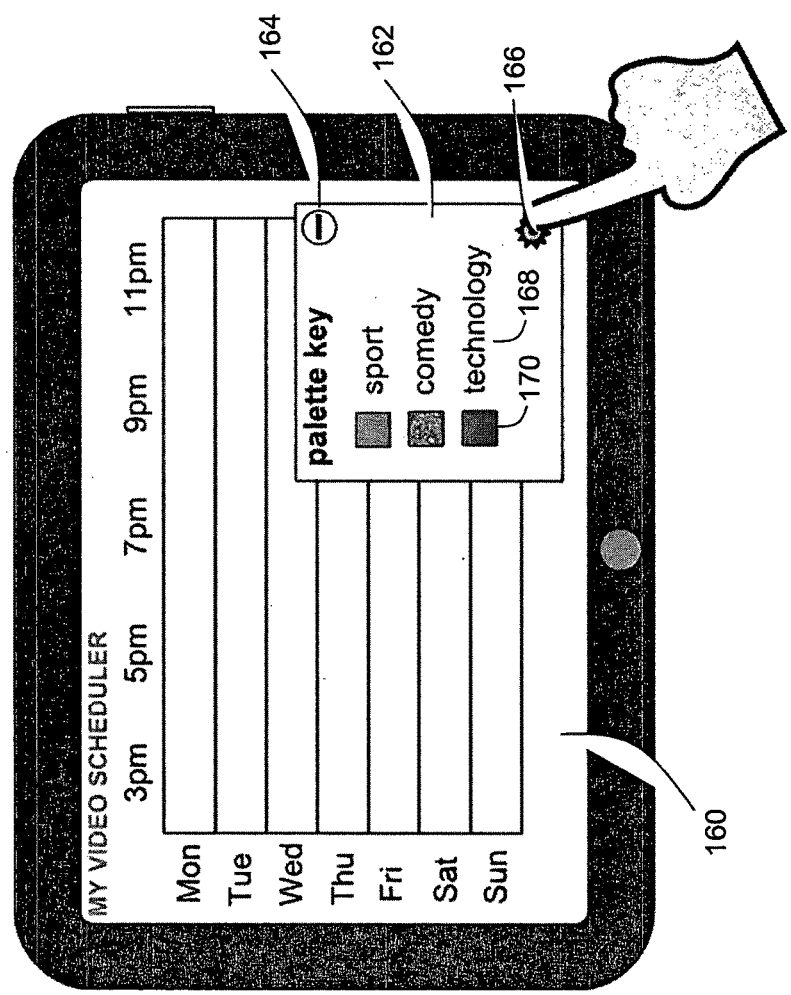
FIGS. 8 to 14 illustrate how a user can customise the palette key used in the first embodiment.

The client application 92 then draws (FIG. 8) a query mapping area 160 across the display screen 68 of the tablet device 10. The mapping area has seven rows (labelled on the left-hand side of the display in an order from top to bottom corresponding to the order of the days of the week). Across the top of the mapping area there are labels representing the time of day, that time increasing linearly from left-to-right along the length of display 68.

The client application 92 thereafter adds a "palette key" widget 162 to the display 68. The palette key 162 shows a default visual style for selected ones of the categories included in the object taxonomy 51. The palette key 162 can be minimised by the user by tapping on minimise icon 164, the palette key 162 then being overwritten by re-drawing the mapping area across the display. The palette key widget 162 is a template, and, if the user has overwritten the default mappings, is populated with a set of user-selected categories whenever it is maximised by the user.

The widget 162 shows a textual label 168 for each of three default categories of video, each textual label 168 being placed alongside an individually-visually-styled square 170. The widget also has a customise icon 166 in its bottom right-hand corner.

Figure 9:
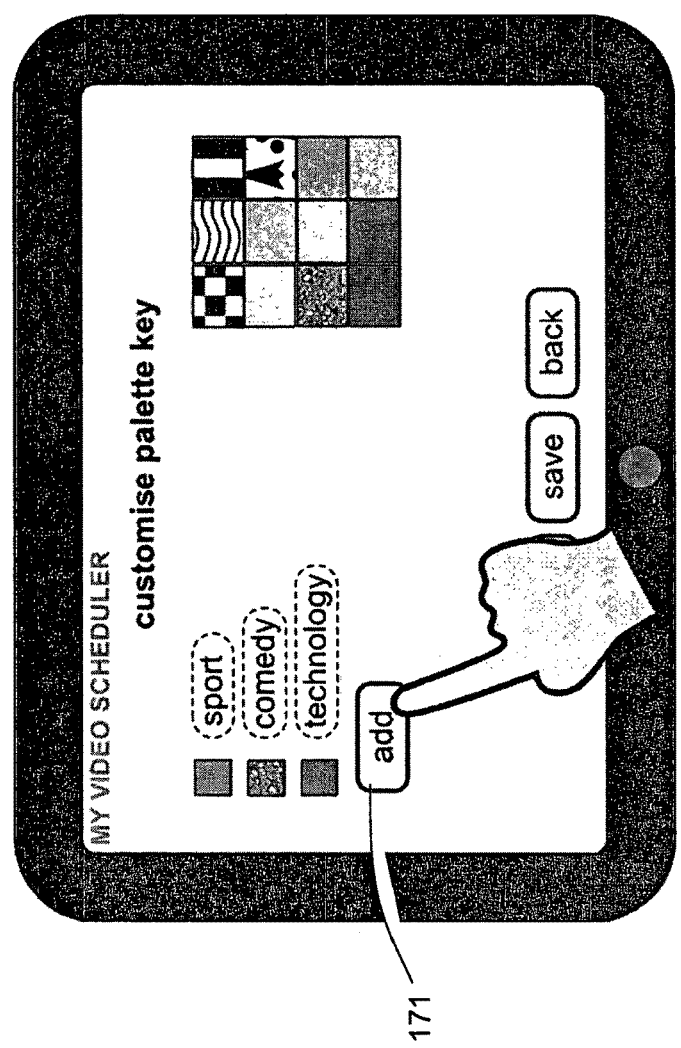
Figure 10:
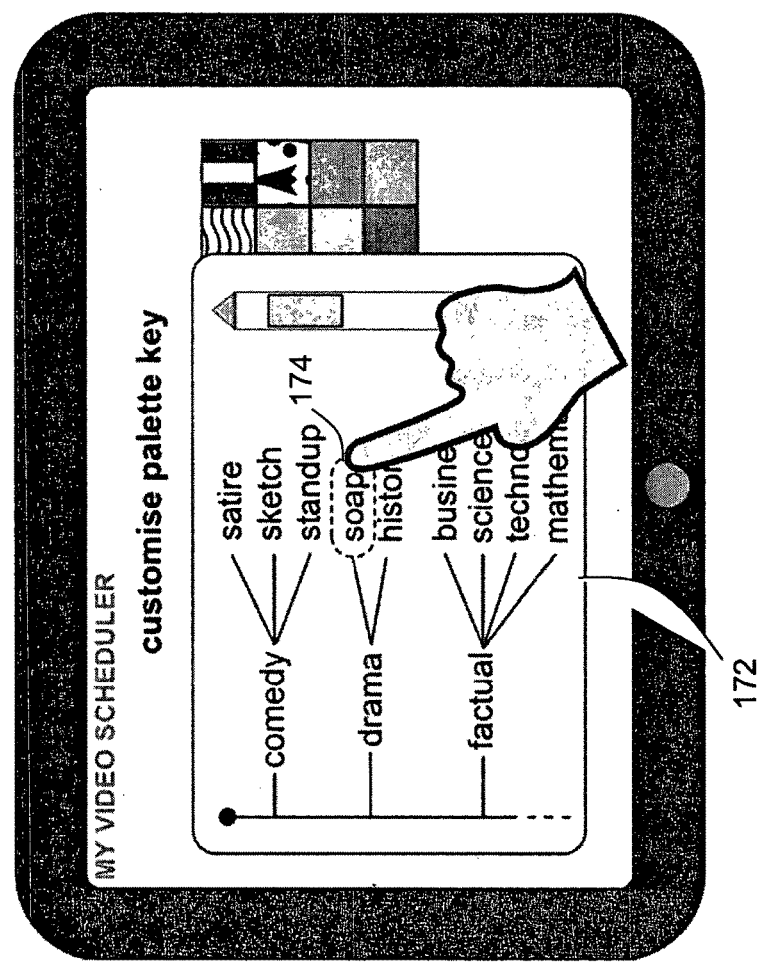
Figure 11:
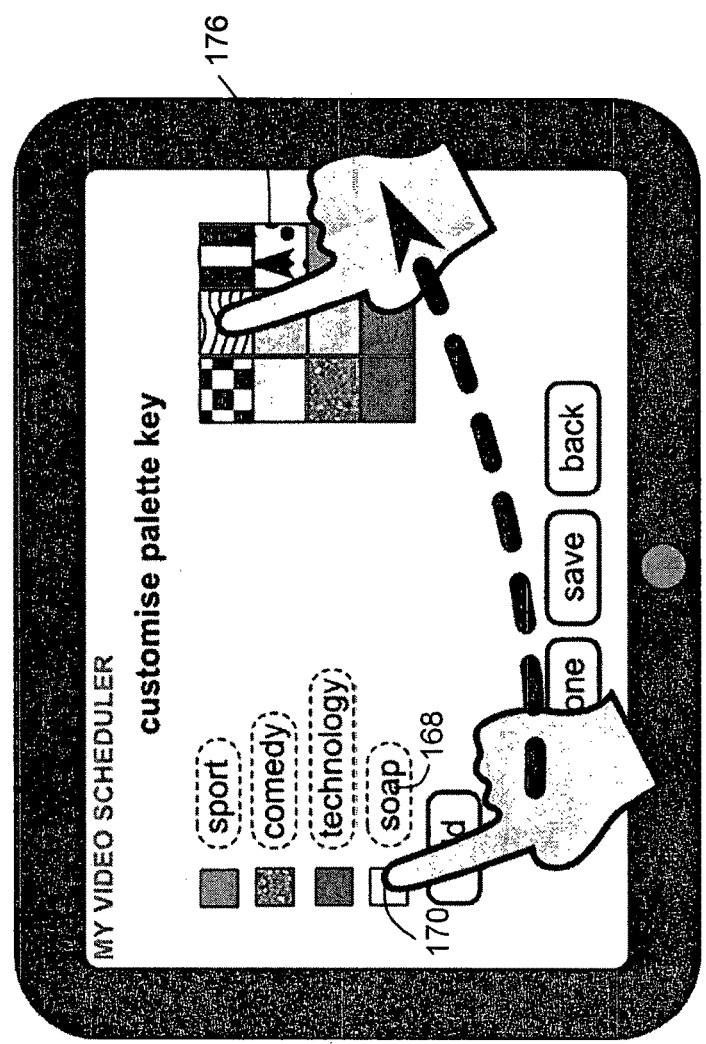

If the user taps on the customise icon 166, then the client application 92 displays a palette key customisation screen (FIG. 9). This includes an 'add' button 171 which the user can tap to cause the client application 92 to control the touchscreen 68 to display a category selection screen (FIG. 10) within which the object taxonomy 51 is displayed as a tree 172. The user can then click on a node (for example 'soap' node 174) to add the corresponding category to the set of user-selected categories to be included on the palette key 162. The client application then draws a visual style selection screen (FIG. 11) which allows the user to tap on a square 170 placed alongside the textual description 168 of a category and then tap again on a visual style from a menu 176 of visual styles which the user wishes to associate with that category.

Figure 12:
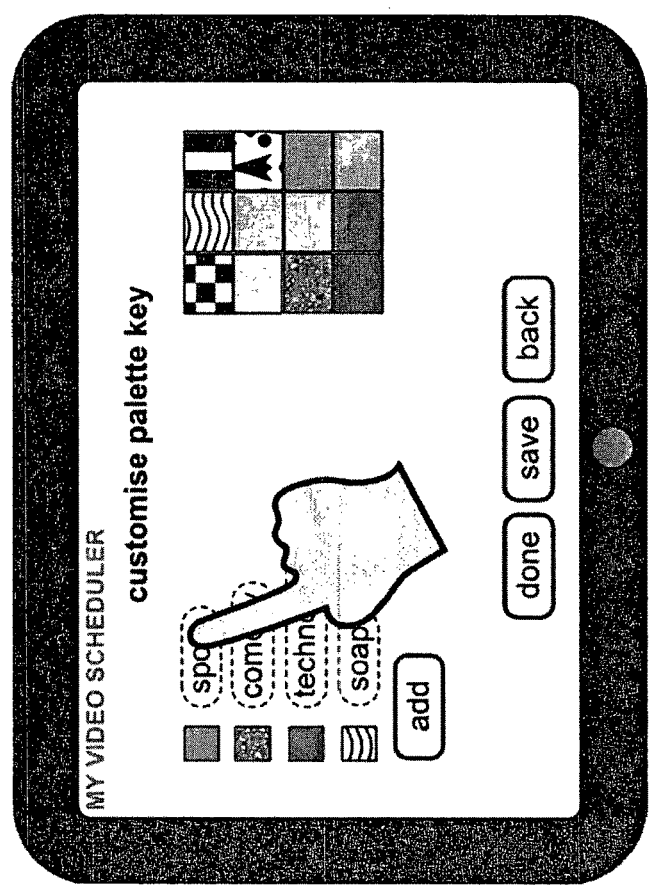
Figure 13:
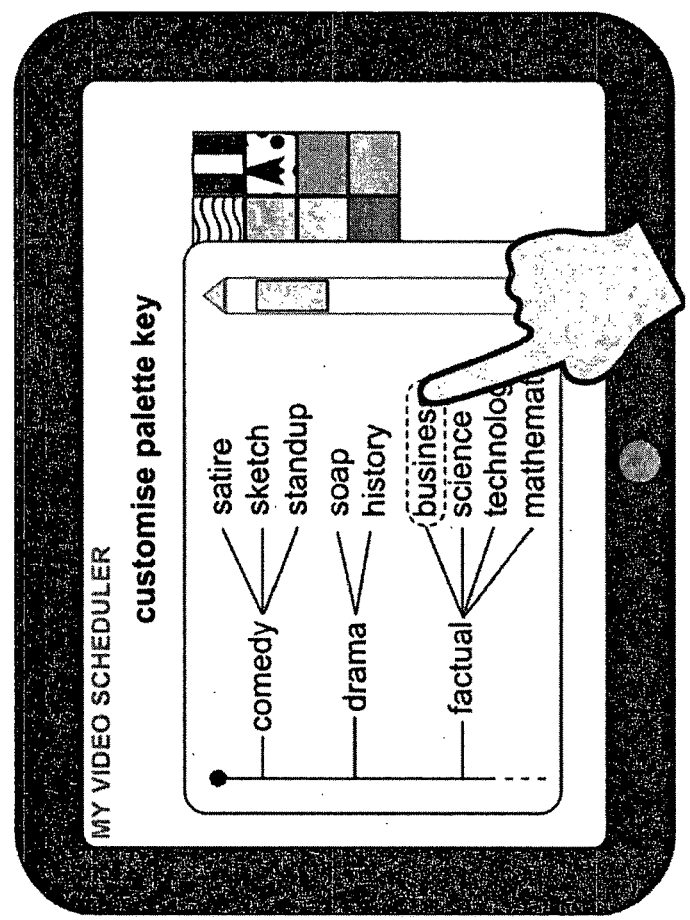
Figure 14:
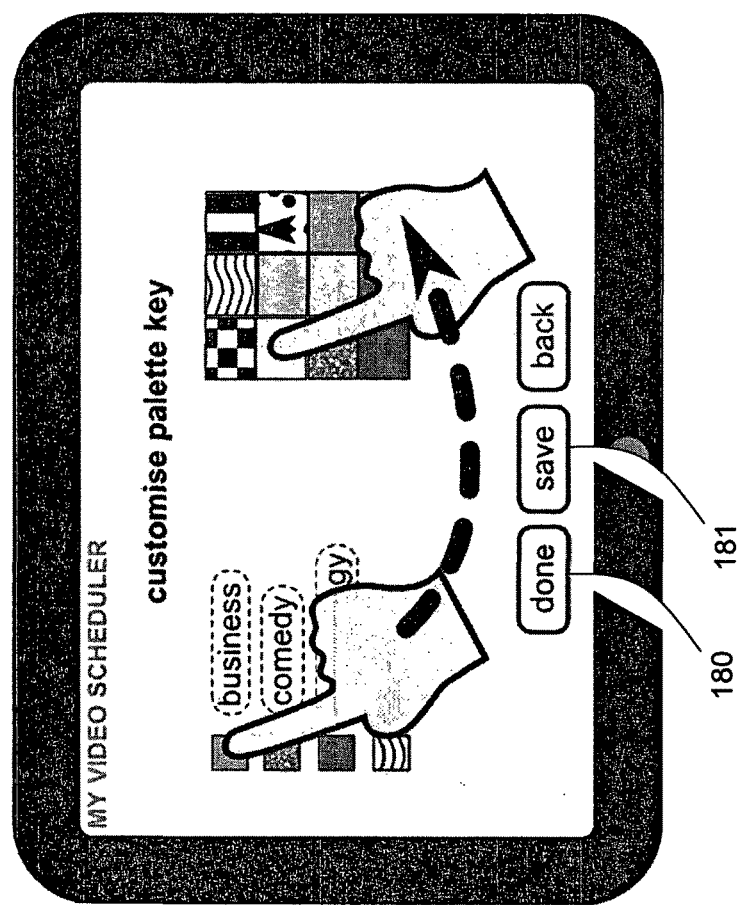

The client application 92 interface further allows the user to replace one of the user-selected categories with another category from the object taxonomy 51 as is illustrated in FIGS. 12-14. When the user has finished selecting categories for use in the subsequent search specification input, the user taps the 'done' button (FIG. 14-item 180).

If desired, the user taps the Save button 181. This results in the client application 92 saving the customised palette under a user-defined name in the tablet device's non-volatile memory. The customised palette is then automatically loaded when the client application 92 next boots up.

Figure 15:
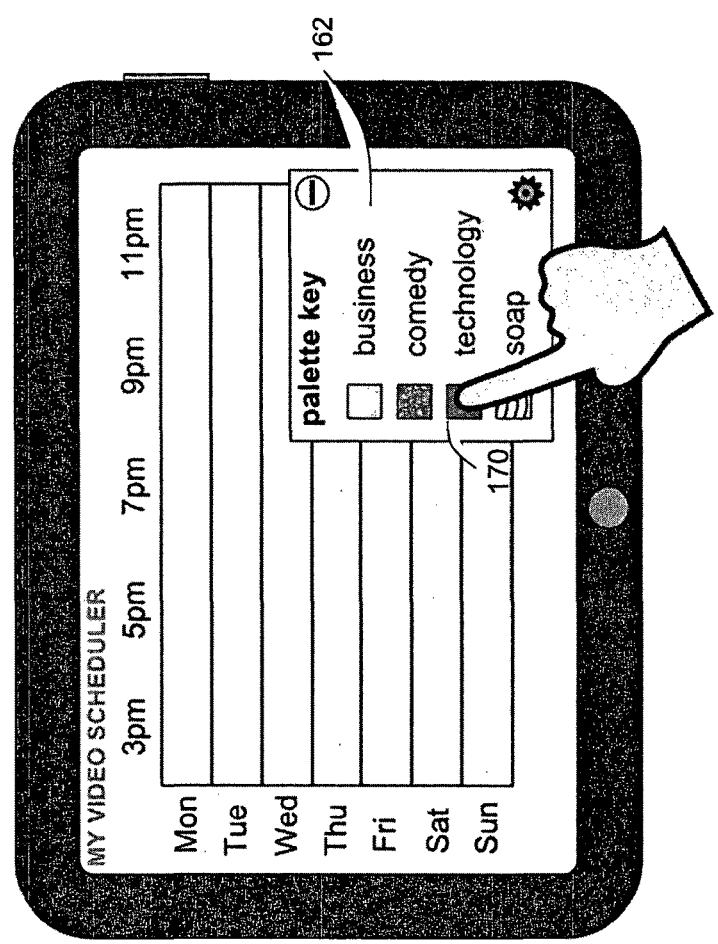
FIGS. 15 and 16 illustrate a requirement entry interface offered to the user.

The client application 92 then controls the tablet device to display a search specification entry screen (FIG. 15). At this time, the quantisation module 97 within the query builder 96 prepares to quantize the user's sketch by initialising an array having an entry for each 5 minute slice of time in each day with null values.

Thereafter, the interface reacts to a user tapping one of the visually styled squares 170 by minimising the palette key widget 162 and then painting, in that visual style, any area of the touchscreen which the user touches between the next touch of the screen and the point where he lifts his finger from the screen 68. Once the user lifts his finger from the touchscreen, the palette key 162 is redrawn on the screen 68. At this time, the quantisation module 97 sets the array entry for each slice where a majority of the pixels in the slice were just painted to the category ID selected immediately before the painting operation.

Figure 16:
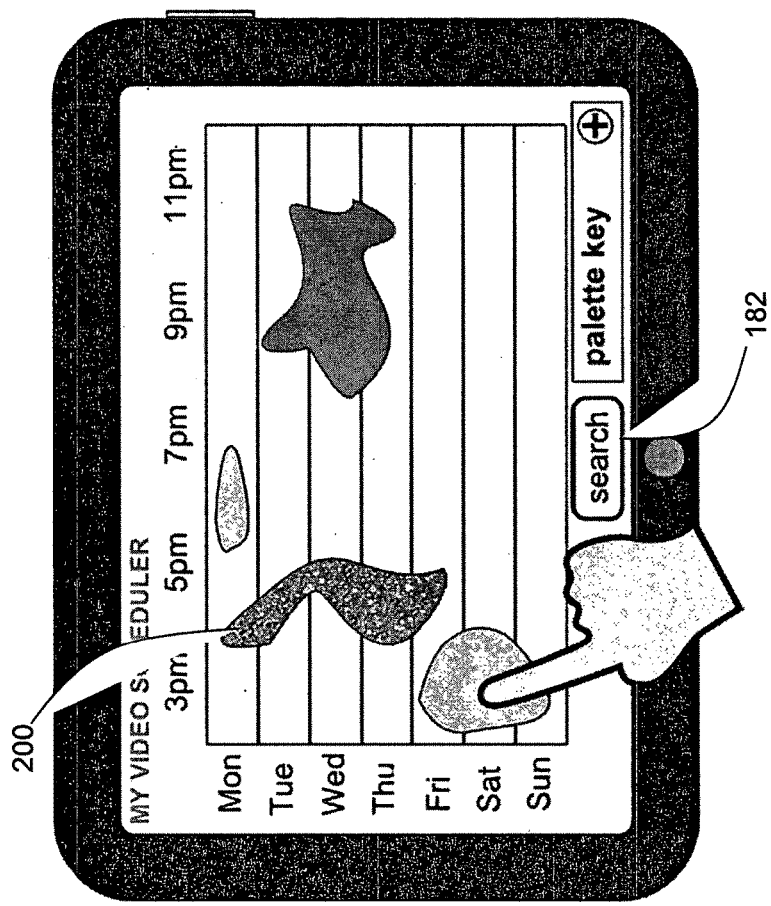

The user is thus able to select visual styles and draw on the digital canvas displayed at the tablet surface areas in visual styles to represent, for each user-selected category, ordinal search value constraints for the search results to fulfil. An example of how a search specification entry screen might look after four rounds of painting by the user is shown in FIG. 16. The array generated by the quantisation module records the user's search specification.

On the user tapping a Search button 182, the array is used to form a set of spatial queries—for example, the first two spatial queries generated by the user's portrayal of what sort of video he'd like to watch at what time might be as follows:
[contains(2013-09-16,15:30,01:00,comedy):true]
[contains(2013-09-16,17:00,02:00,business):true]

Thus, the database might respond to the first example query above with a ranked set of results meeting the temporal and category constraints (e.g. entries 121-129 in FIG. 6), followed by another ranked set of results meeting the temporal and category constraints of the second example query (e.g. entries 131-136 in FIG. 6).

In practice these results would be presented to the client application 92 in the form of XML as follows:

```
<?xml version="1.0" encoding="ISO-8859-1"?>

<spatialLocationList>
                <date>2013-09-16</date>
                <startTime>15:30</startTime>
                <item>
                        <duration>00:30:00</duration>
                        <rank>1</rank>
                        <itemId>01781</itemId>
                        <location>http://www.bbc.co.uk/iplayer/episode/b00wlg99/
Live_at_the_Apollo_Series_6_Episode_3/ </location>
                        <name> Live at the Apollo - Series 6 Episode 3</name>
                </item>
                <item>
                        <duration>...</duration>
                        <rank>...</rank>
                        <itemId>...</itemId>
                        <location>...</location>
                        <name>...</name>
                </item>
        </spatialLocationList>
        <spatialLocationList>
                ...the next set of results for the next quantised slot that has result matches and so on...
        </spatialLocationList>

```

It will be seen how the first spatial query corresponds to the extent of the visually styled shape 200 within the Monday row of the graphical search interface, and how the visual style of that shape corresponds to the comedy category given the visual-style-to-category association seen within the palette key widget 162 (FIG. 15).

The spatial database 48 receives the query set, and processes it by sequentially calculating the most relevant set of articles to return for each element of the spatial query. In processing each element of the query, the speed of response of the search engine is improved by using the index on annotations to find available on-demand data, and using the spatial index to find suitable scheduled transmissions.

Once a set of results is found for each element of the query, the search engine runs a ranking module to order the results returned to the user, and/or to limit the number of results (for example, only the twelve highest ranked results for each query string element might be returned).

The server computer 16 then creates and transmits a result string comprising, for each query string element, a corresponding result string element which includes database entries which match the query string element. Where the result is a video available on demand, the search engine sets the date and start-time in the entry to the date and start time found in the query.

To continue the above example, when presented to the spatial database 48, the first spatial query will return database entries which are categorised as 'comedy' and which are either:
i) in the case of scheduled transmission, scheduled to be transmitted in their entirety during the available time period; or
ii) in the case of content available on-demand, of sufficiently short duration to fit with the available time period.

Figure 17:
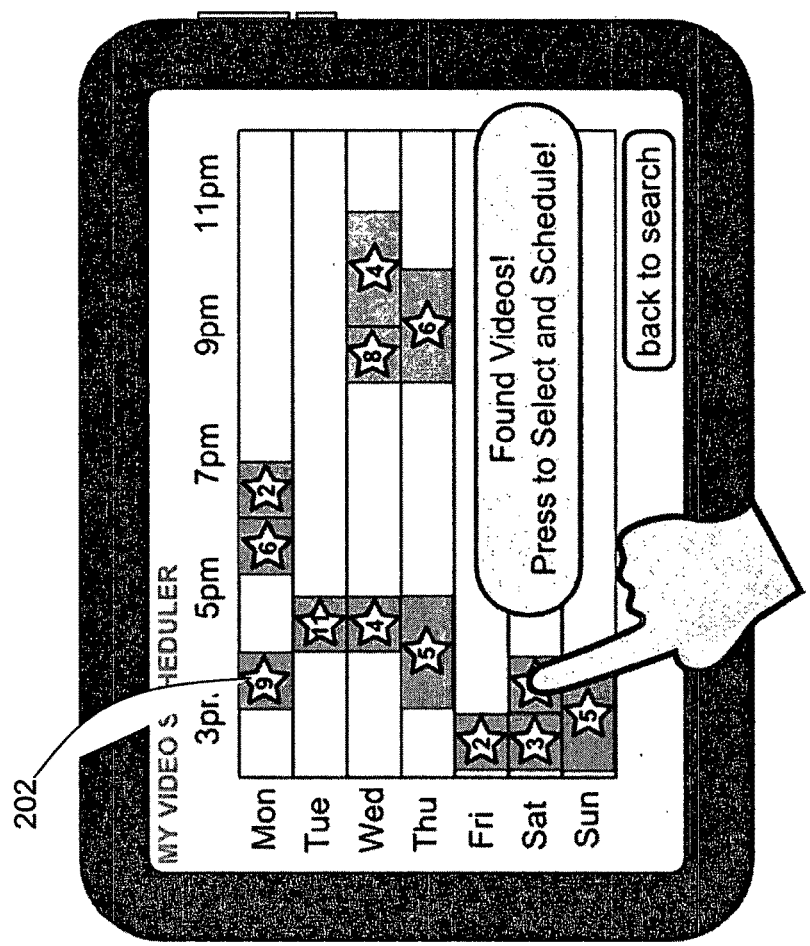
FIG. 17 shows a display of results presented to the user.

On receiving the results from the server 16, the tablet device 10 runs a response builder module 19 which redraws the mapping area 160 and places the results received from the search engine at a location corresponding to the time period defined in the result (FIG. 17). For each query element which results in one or more hits, the response builder module draws a rectangle whose left and right edges are at positions along the x-axis corresponding to the start time and duration defined in the query element. In each case, the rectangle is annotated with the number of hits 202 returned in relation to the query element (the client application counts the number of relevant entries in the results).

Figure 18:
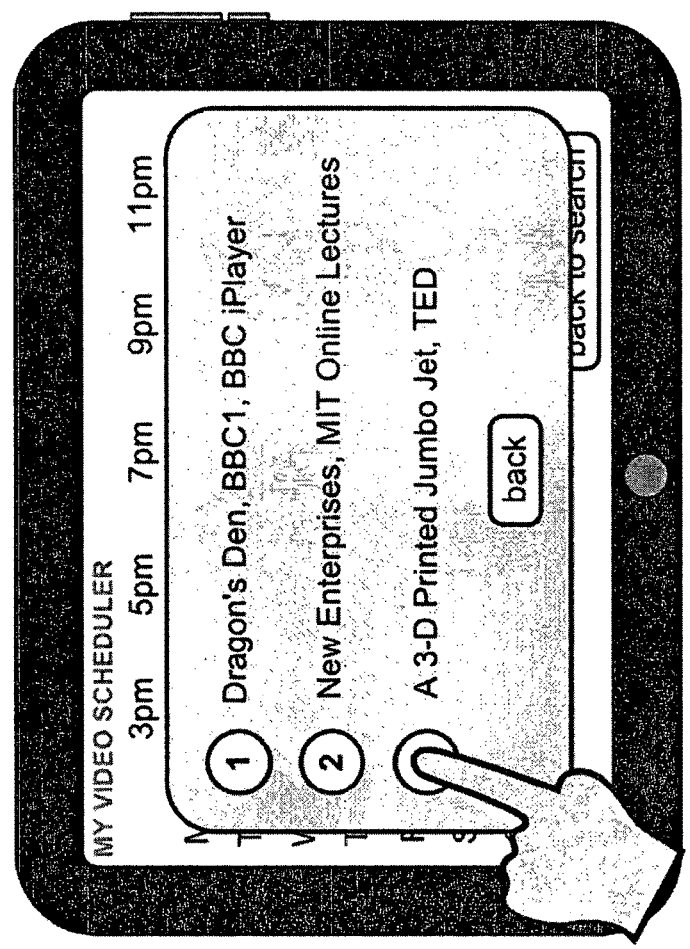
FIG. 18 shows how the interface enables a user to select one of a plurality of options for a selected slot.

As will be understood by those skilled in the art, event handlers are associated with each rectangle which are run on the user touching the screen at the location of the rectangle. In each case, the event handler reacts to a user's touch by displaying a list of items (FIG. 18) which meet the requirements set out in each element of the query string. Each element in the list in turn has an event handler associated with it, so that when the user touches the display at the position of one of the listed items, the client application will save this item.

Figure 19:
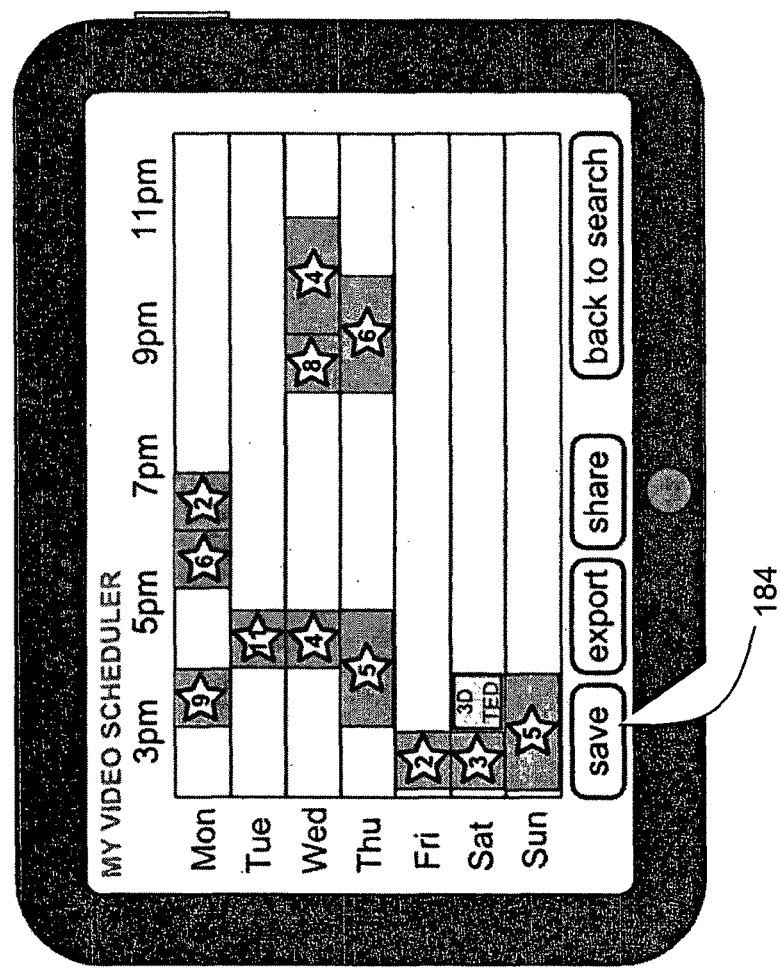
FIG. 19 shows the display after the user has finished selecting from the available options.

This selection process is repeated until the user presses a save button 184 (FIG. 19).

The client application can then use the user's saved selection to perform actions like
SMS alerts
on loading the application at a time when there is a selected video to play—start playing that video from the source location e.g. youtube/iPlayer
on selection, load a personalised channel e.g. Channel 1000 "Jia-Yan's Channel" with the users selected live programmes—this removes the need to traverse an EPG and provide a user with, in effect, one channel when they turn their television on, or one channel per member of the household, for example:

Dad's Channel-preloaded with selected programmes Dad chose using the embodiment described above.
Mum's Channel-preloaded using Mum's tablet with Mum signed in to the client application
Fred's Channel-etc
Kate's Channel-etc It will be seen how the above embodiment enables the user to specify rapidly and intuitively the types of content they would wish to watch at different times of the week. This is possible because the database which stores metadata about the items to be arranged into the schedule already included a category for each content item.

Possible variations on the above embodiment include (this list is by no means exhaustive):

i) objects stored in database could be annotated documents (e.g. if the aim were to provide a reading schedule for a user);

ii) the framework does not have to be presented as a grid formed by intersecting spaced horizontal and vertical lines. Instead one or both dimensions could be indicated by a labelled axis;

iii) in the above embodiment, a position within the framework onto which the user paints can be identified by one discrete ordinal variable—the day-of-the-week value, and one continuous ordinal variable—the time-of-day. In other cases, both of the ordinal variables could be continuous or both could be discrete.

iv) in the above embodiment, the search mapping area was quantised into five minute intervals. Other degrees of quantisation could of course be used ranging from several hours down to the size of a pixel (which would correspond to a few seconds).

A second embodiment will now be described with reference to FIGS. 20 to 27.

Much of a sales specialist's time is spent researching and preparing sales proposal documents. Often, as a starting point, sales specialists may search for previous proposal documents which have offered similar products and services. There is, however, no current means to specify the relative proportions of each section of the document (the distribution of different concepts), nor the proportion of the document which is focused on a particular concept. The sales specialist may also remember a previous proposal based on the position of embedded media within the document that he/she wishes to find to use as a basis for a current opportunity.

As each sales opportunity needs to be customised to a particular customer, it would be advantageous to be able to specify, as part of the search, the proportion of text which is dedicated to certain concept that he/she thinks would appeal more to the customer rather than using boilerplate documents.

In the above-described first embodiment, the articles had already been categorized. In a second embodiment, as a precursor to the steps carried out in the first embodiment, the articles are automatically categorised by the system.

The hardware used in the second embodiment is similar to that used in the first, save for the addition of another server computer connected to the network 14. The other server computer has a document annotation program installed upon it.

Figure 23:
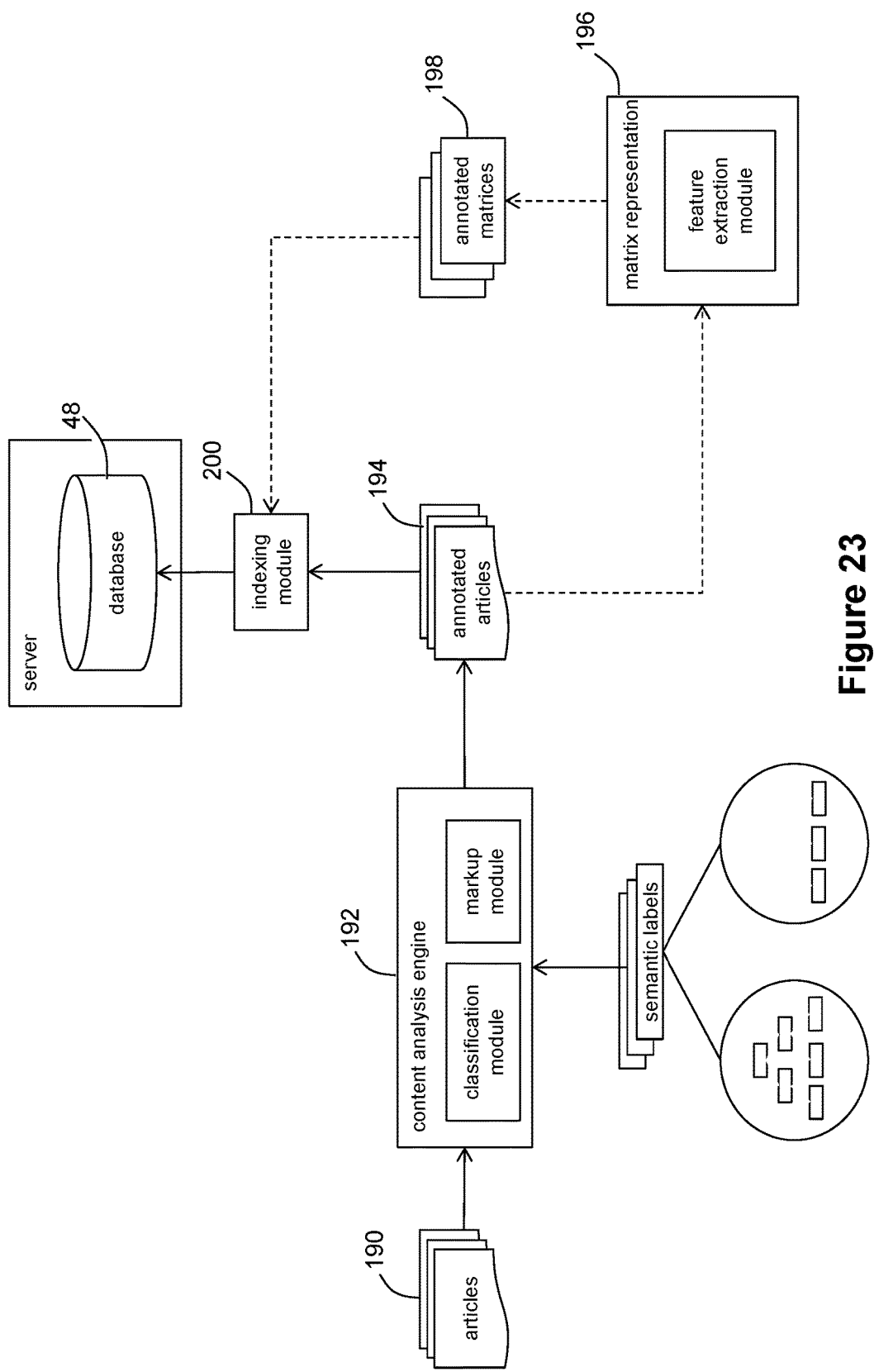
FIG. 23 shows the architecture of additional software used in the second embodiment.

In this second embodiment, the spatial structure of each document is indexed at the server-side (FIG. 23 shows the software architecture associated with this).

The document annotation program is run to mark-up documents 190 with labels from a list of categories (FIG. 20) to classify document sections. It is to be noted that this list of categories provides a classification which has a flat structure in contrast to the hierarchical structure used in the first embodiment.

The document annotation program 192 uses a text classification API (in this example from DigitalPebble Ltd) to automatically annotate each sentence in the document with one or more labels from the classification (FIG. 20). The program also extends the text classification API with other libraries to automatically recognise and annotate embedded media such as images, and record the position of the embedded media within the article.

The annotated articles 194 are then passed to a matrix representation module 196 initialising the elements of an array to a null value. The size of the array for each page of the document might be seven rows by seven columns (for example—as with the first embodiment a range of degrees of quantisation might be used). The matrix representation module 196 then translates the annotated articles into an equivalent matrix representation 198 by storing the category ID(s) that correspond to any annotations found within the article for each matrix position in the corresponding element of the array. This method accommodates multiple annotations per element of the matrix. Alternatively, multiple arrays might be generated for a single document. The benefit of this latter alternative is that it simplifies the vector space similarity calculations.

Figure 21:
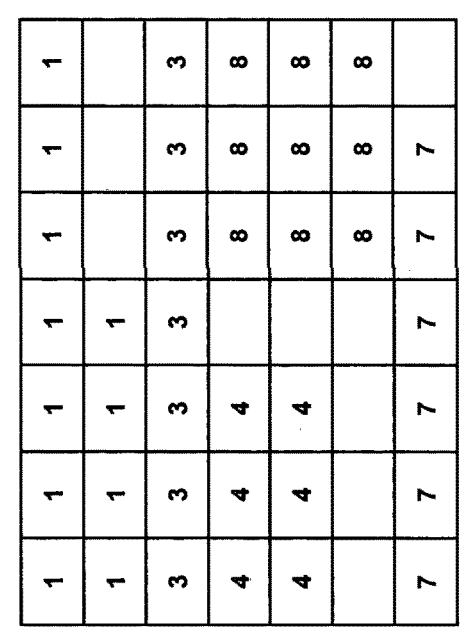

The database 48 used in this embodiment is a spatial database obtained by extending the PostgreSQL database using PostGIS software. The indexing module 200 builds a spatial index (i.e. co-ordinates of each of the matrix elements, each accompanied by a list of the category IDs found within that element—see FIG. 21). Referring to FIG. 21, it can be seen that each element of the seven-by-seven quantisation matrix holds a number representing the category of content (sentences or embedded media) which extend into or over each of the forty-nine areas of a page of the document.

Figure 24:
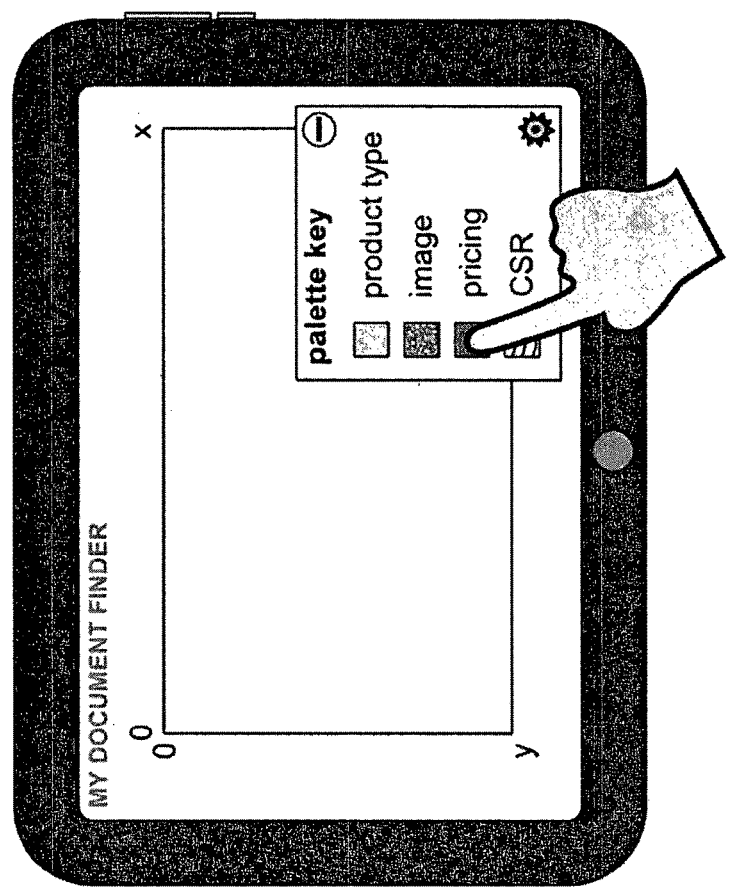
FIGS. 24 and 25 show a requirement entry interface offered in the second embodiment.

When the client application boots up, the client application contacts the database to obtain the category list, and displays a palette key offering a default selection of categories from that category list (FIG. 24). The user is able to change the categories and associated visual styles as described above in relation to the first embodiment.

Using similar techniques to those described above in relation to the first embodiment, a query, which comprises one or more concepts, is formed by the user on the basis of 'painting' the tablet screen 68 with visual styles representing the distribution of concepts he or she hopes to find in one or more documents in the database. By painting different areas in different visual styles, the user portrays a concept map which indicates the distribution of concepts he wishes to see in documents returned from the database 48.

In this second embodiment, the query template is: [function(document_x, document_y, annotation):boolean].

Figure 25:
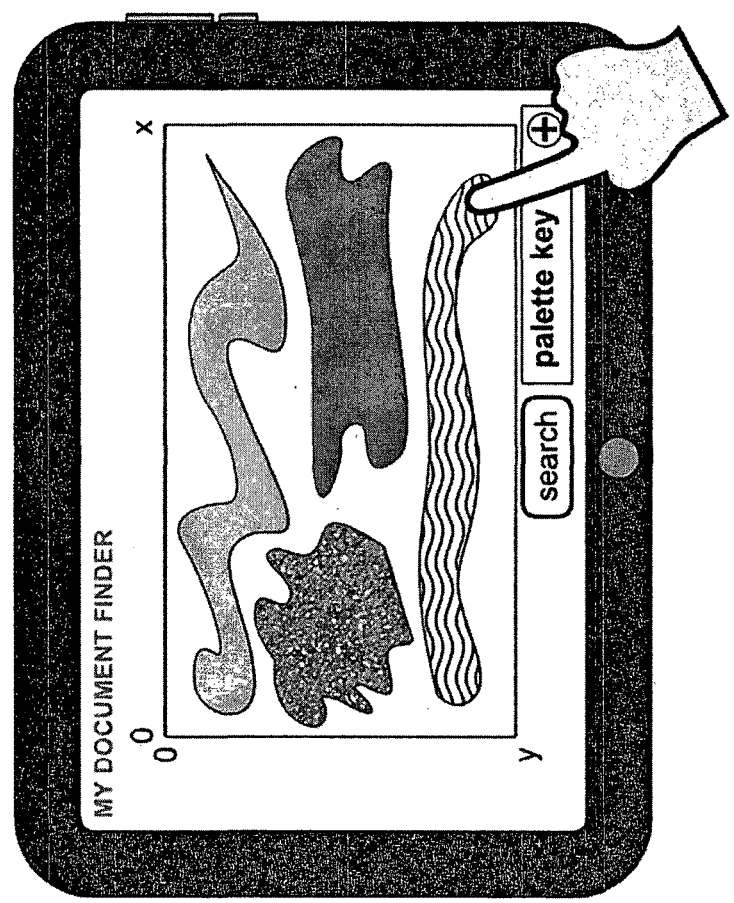

Should a user submit a search portrayal similar to that seen in FIG. 25, then the query sent to the server computer might read as follows:

```
[contains (1, 0, product info) : true]
[contains (2, 0, product info) : true]
[...]
[contains (1, 1, image) : true]
[contains (2, 1, image) : true]
[...]
```

[contains (6, 7, CSR) : true]
[contains (7, 7, CSR) : true]
[user metadata]

The search engine processes the user query to find a list of articles that closely match the query by similarity of spatial structure of content, and ranks them according to an algorithm that calculates nearest match, such as using the vector space model to calculate relevance. The search engine returns to the tablet a ranked list of whole articles as the results. In practice, the results will be returned as an XML document (see FIG. 22).

Figure 26:
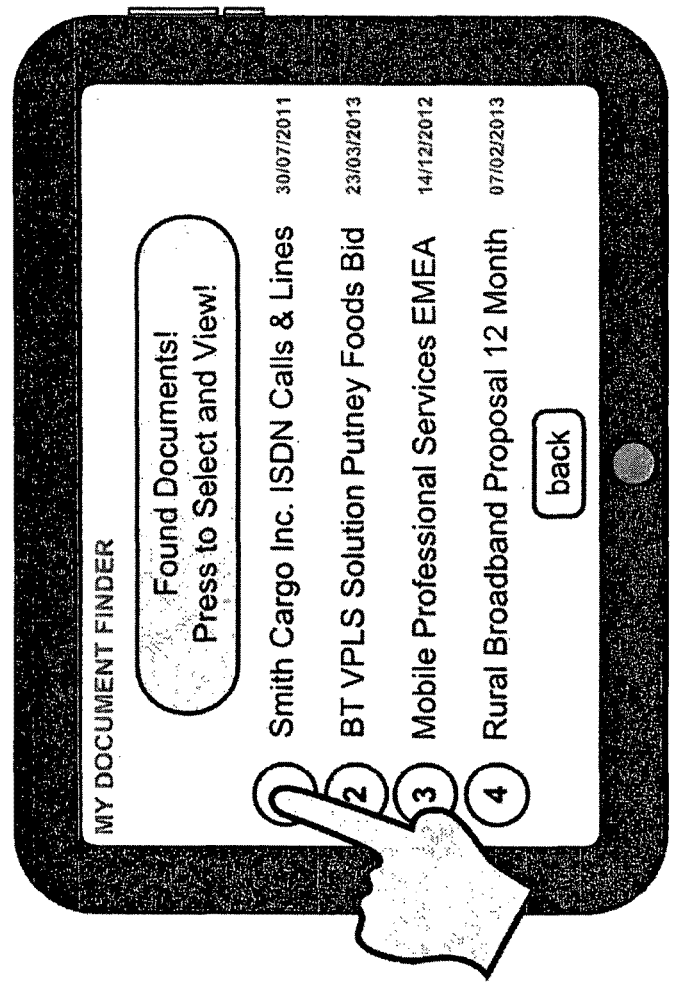
FIG. 26 shows a results page presented to the user.
Figure 27:
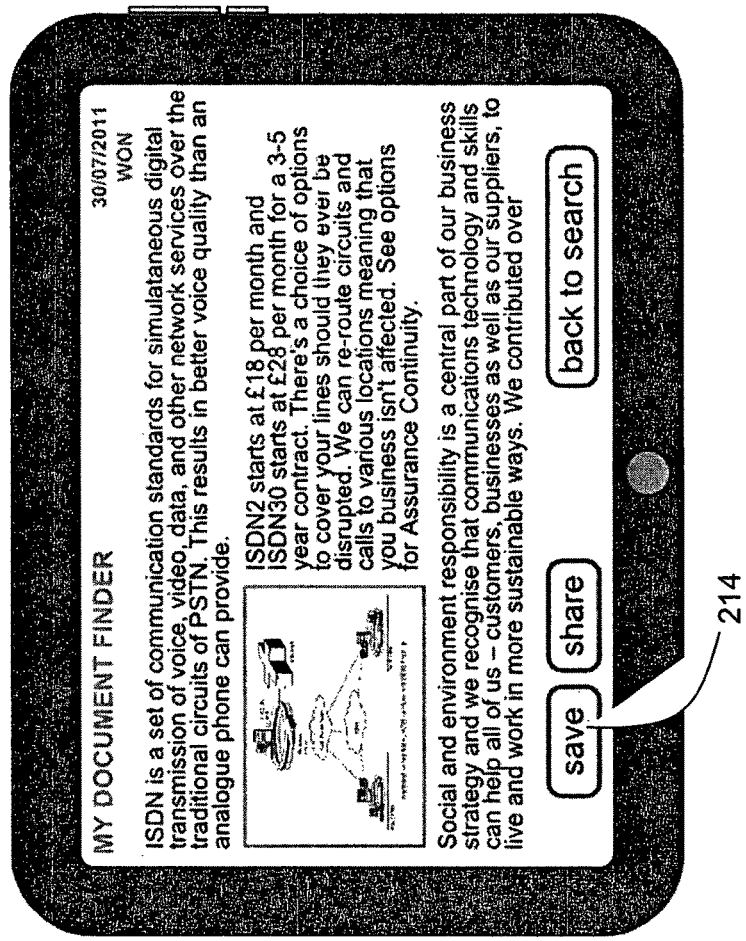
FIG. 27 shows how a selected result is displayed to the user in the second embodiment.

The client application controls the tablet 10 to display the results (FIG. 26). On tapping one of the items in that list, the document the client application can go to the location of the document which is included in the result string to download and view the full document (FIG. 27) and have the option to save it locally by tapping on save button 214.

Possible variants on the second embodiment include that the document returned to the user might be highlighted in areas that matched parts of the query.

Possible variants on either of the above described embodiments include:

i) in the above embodiments, the database was stored on the hard disk of the server computer 16. It might instead be stored in some other form of storage, for example within a disk array, or network attached storage etc.

ii) in the above embodiments, the database management system is an object-oriented database management system. However, other database management systems might be used, including relational database management systems;

iii) in the above embodiments, the client device was a tablet device. It could have instead been a personal computer (laptop or desktop), smartphone, smart television etc.

iv) in the above embodiments, the client application was pre-programmed with an address of the database from which the client application gets the data which the user is to search. In other embodiments, the client application might provide the user with the ability to enter an address for the database with which they wish to interact (the client application might, in other words, provide a database browser);

v) in the above embodiments, the palette key showed the annotation label alongside a square filled with a visual style. Of course, any shape filled with the visual style might be used. Alternatively, the text could be overwritten on a shape filled with the visual style—this alternative would work best where the different visual styles were different plain colours;

vi) in the above embodiments, the palette key overlaid the underlying grid. In other embodiments, the palette key could be displayed separately from the grid, or partially overlap it.

vii) The search engine can either run within the same server as the database or on a separate networked server;

viii) the user can use a tablet or any pointing device with a display such as a mouse and screen to construct their query, however a tablet or smartphone has the advantage that it can be used in the field;

ix) in the above embodiments, the display used was that of the tablet device, however in other scenarios it might be useful to have the tablet device provide its display output to a different display device—for example a television, projector or remotely connected display e.g. teleconferencing screen. This could be exploited in many other situations where a user wants to use a tablet device as the means to control and interact with an application and for the results of that action to be displayed on a much larger display;

x) the above embodiments focussed on two specific examples of data with which a user might wish to interact, namely a video item database and a document collection. However, the interface is by no means restricted to any given field of use. It is useful in network management (for example, be used by fault analysts to look for occurrences of certain types of fault in a telecommunications network, where the user's search criteria are specified through the concept to colour palette and user input control overlaid on a geographic map). Other possible fields of use include the investigation of criminal activity where the interface might be used to search a database of documented criminal events, which are overlaid onto a geographic map, that match a set of criminal events currently under investigation to uncover patterns faster than manual methods of bringing together related information or evidence. A non-geographic crime application could be as an interface to a system for searching criminal communications e.g. webpages, emails, electronic-based propaganda which match a pattern of concepts presented using the paint interface described above.

In summary of the above disclosure, a search system interface is described. Known search system interfaces are largely unable to find composite articles on the basis of a description of the distribution of content types within them. A problem with providing such a search interface is the laboriousness of generating a suitable query. To address this problem, a display is provided with a key showing content types and associated map symbols. Also provided on the display is a search mapping area, which takes advantage of the fact that parts of text documents, and many other types of searchable items, can be referenced by one or more ordinal values, by having an easily perceivable relationship between position in the search mapping area and position within a target document. By operating the device to offer a digital painting interface such that the user can paint parts of the search mapping area in a visual style associated with the content type the user hopes to find in the corresponding part of the text document, the user is able to rapidly and intuitively provide the search system with a description of how content types would be distributed in documents he wishes to find. The search system interface can similarly be used to specify a desired composition of articles belonging to different categories over a period of time.

What is claimed is:

1. A search system interface comprising:
   a display device;
   a pointing device;
   a processor in communication with said display device and said pointing device in use, said processor being arranged in operation to:
   i) control said display device to display a system output mapping area;
   ii) receive mapping inputs from said pointing device, the mapping inputs being indicative of:
      a) a plurality of sub-areas of said system output mapping area, at least one of the plurality of sub-areas having a different shape than another one of the plurality of sub-areas; and
      b) one or more system output component categories attributed to each of said sub-areas;
   iii) further control said display device to display,
      a reference framework indicative of a way in which different parts of the mapping area map to different parts of a heterogeneous composite digital item; and
      for each sub-area, a visual indication of the extent of said sub-area in association with a map symbol symbolising the attribution of the system output component category to that sub-area;

whereby the user is able to draw a map symbolically representing the arrangement of components in different categories which user wishes to see in heterogenous composite digital items returned by the search system:

iv) generate search data from said mapping inputs by converting data defining each of said plurality of sub-areas drawn by the user to data defining a corresponding system output region, and associating the system output component category attributed to that sub-area by the user with that system output region, the search data specifying arrangements of categorised constituent parts which the user wishes to see in heterogeneous composite items returned by the search system;

v) pass said search data to said search system; and vi) receive one or more heterogeneous composite digital items, or identifiers thereof, from the search system in response to passing the search data to the search system.

2. A search system interface according to claim 1 wherein the generation of the search data comprises calculating one or more ordinal search values as a function of the position of each mapping input on the display.

3. A search system interface according to claim 2 wherein the generation of the search data comprises converting the screen position of a mapping input to the values of two ordinal search value types.

4. A search system according to claim 3 wherein said search system interface is arranged in operation to provide a user with a digital painting interface to enable the user to generate a mass of mapping inputs with a single gesture.

5. A search system interface according to claim 1 wherein said reference framework comprises reference lines indicating a co-ordinate system to the user.

6. A system interface according to claim 1 wherein said system interface is further arranged in operation to control said display to display a map symbol key showing map symbols and respective categories.

7. A system interface according to claim 1 wherein said system interface is further arranged in operation to control said display to display a palette of said map symbols, wherein said mapping inputs include a user selection of a map symbol from said palette, and further inputs, received whilst said map symbol is selected, defining the region to be occupied by a component of the category associated with said map symbol.

8. A system interface according to claim 1 further comprising a store storing map symbol to category mapping data.

9. The search system interface according to claim 1 wherein:

the reference framework comprises reference lines indicating a co-ordinate system;

one reference line indicating the co-ordinate system corresponds to days of a week; and one reference line indicating the co-ordinate system corresponds to hours of a day.

10. A method of operating a system to provide a system interface, said system comprising a display and a pointing device, said method comprising:

i) controlling said display device to display a system output mapping area;

ii) receiving mapping inputs from said pointing device, the mapping inputs being indicative of:

a) a plurality of sub-areas of said system output mapping area, at least one of the plurality of sub-areas having a different shape than another one of the plurality of sub-areas; and b) one or more system output component categories attributed to each of said sub-areas;

iii) further controlling said display device to display, a reference framework indicative of a way in which different parts of the mapping area map to different parts of a heterogeneous composite digital item; and for each sub-area, a visual indication of the extent of said display sub-area in association with a map symbol symbolising the attribution of said system output component category to that sub-area;

whereby the user is able to draw a map symbolically representing the arrangement of components in different categories which the user wishes to see in heterogeneous composite digital items returned by the search system;

iv) generating search data from said mapping data by converting data defining each of said plurality of sub-areas drawn by the user to data defining a corresponding system output region, and associating the system output component category attributed to that display sub-area by the user with that system output region;

v) passing said search data to said search system; and vi) receiving one or more heterogeneous composite digital items, or identifiers thereof, from the search system in response to passing the search data to the search system.

11. A method according to claim 10 further comprising operating said system to label different sections of digital data items as belonging to different categories.

12. The method according to claim 10 wherein:

the reference framework comprises reference lines indicating a co-ordinate system;

one reference line indicating the co-ordinate system corresponds to days of a week; and one reference line indicating the co-ordinate system corresponds to hours of a day.

13. A non-transitory computer-readable medium tangibly embodying a program of instructions executable by a computer having a display and a pointing device to:

i) control said display device to display a system output mapping area;

ii) receive mapping inputs from said pointing device, the mapping inputs being indicative of:

a) a plurality of sub-areas of said system output mapping area, at least one of the plurality of sub-areas having a different shape than another one of the plurality of sub-areas; and b) one or more system output component categories attributed to each of said sub-areas;

iii) further control said display device to display, a reference framework indicative of a way in which different parts of the mapping area map to different parts of a heterogeneous composite digital item; and for each sub-area, a visual indication of the extent of said display sub-area in association with a map symbol symbolising the system output component category attributed to that sub-area;

whereby the user is able to draw a map symbolically representing the arrangement of components in different categories which the user wishes to see in heterogeneous composite digital items returned by the search system;

iv) generate search data from said mapping data by converting data defining each of said plurality of sub-areas drawn by the user to data defining a corresponding system output region, and associating the system output component category attributed to that sub-area by the user with that system output region, the search data specifying arrangements of categorised constituent parts which the user wishes to see in heterogeneous composite items return by the search system;

v) pass said search data to said search system; and vi) receive one or more heterogeneous composite digital items, or identifiers thereof, from the search system in response to passing the search data to the search system.

14. The non-transitory computer-readable medium according to claim 13 wherein:

the reference framework comprises reference lines indicating a co-ordinate system;

one reference line indicating the co-ordinate system corresponds to days of a week; and one reference line indicating the co-ordinate system corresponds to hours of a day.

\* \* \* \* \*